US010930065B2

(12) United States Patent
Grant et al.

(10) Patent No.: US 10,930,065 B2
(45) Date of Patent: Feb. 23, 2021

(54) THREE-DIMENSIONAL MODELING WITH TWO DIMENSIONAL DATA

(71) Applicant: X DEVELOPMENT LLC, Mountain View, CA (US)

(72) Inventors: Elliott Grant, Woodside, CA (US); Yueqi Li, San Jose, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 0 days.

(21) Appl. No.: 16/297,102

(22) Filed: Mar. 8, 2019

(65) Prior Publication Data

US 2020/0286282 A1 Sep. 10, 2020

(51) Int. Cl.
*G06T 17/10* (2006.01)
*G06N 20/00* (2019.01)
(Continued)

(52) U.S. Cl.
CPC .......... *G06T 17/10* (2013.01); *G06K 9/00503* (2013.01); *G06K 9/00536* (2013.01);
(Continued)

(58) Field of Classification Search
None
See application file for complete search history.

(56) References Cited

U.S. PATENT DOCUMENTS

| 2005/0275834 A1* | 12/2005 | Silver | G06T 7/0004 |
| | | | 356/237.1 |
| 2007/0031028 A1* | 2/2007 | Vetter | G06K 9/00208 |
| | | | 382/154 |

(Continued)

FOREIGN PATENT DOCUMENTS

| CN | 101739714 | 6/2010 |
| EP | 2675173 | 12/2013 |

(Continued)

OTHER PUBLICATIONS

Sun et al.; 3D Computer Vision and Machine Learning Based Technique for High Throughput Cotton Boll Mapping under Field Conditions; 2018 ASABE Annual International Meeting; 10 pages; dated Jul. 29, 2018.

(Continued)

*Primary Examiner* — Sultana M Zalalee
(74) *Attorney, Agent, or Firm* — Middleton Reutlinger

(57) ABSTRACT

Implementations are described herein for three-dimensional ("3D") modeling of objects that target specific features of interest of the objects, and ignore other features of less interest. In various implementations, a plurality of two-dimensional ("2D") images may be received from a 2D vision sensor. The plurality of 2D images may capture an object having multiple classes of features. Data corresponding to a first set of the multiple classes of features may be filtered from the plurality of 2D images to generate a plurality of filtered 2D images in which a second set of features of the multiple classes of features is captured. 2D-3D processing, such as structure from motion ("SFM") processing, may be performed on the 2D filtered images to generate a 3D representation of the object that includes the second set of one or more features.

20 Claims, 8 Drawing Sheets

(51) Int. Cl.
  *G06K 9/00*      (2006.01)
  *G06N 3/08*      (2006.01)
  *G06T 7/20*      (2017.01)
(52) U.S. Cl.
  CPC .............. *G06N 3/08* (2013.01); *G06N 20/00* (2019.01); *G06T 7/20* (2013.01); *G06T 2210/12* (2013.01)

(56) References Cited

U.S. PATENT DOCUMENTS

| | | | |
|---|---|---|---|
| 2009/0296984 A1* | 12/2009 | Nijim | G06K 9/4671 382/103 |
| 2010/0085356 A1* | 4/2010 | Nie | G06T 15/205 345/419 |
| 2011/0008754 A1* | 1/2011 | Bassett | A61F 2/2803 433/175 |
| 2011/0074778 A1* | 3/2011 | Turner | H04N 13/261 345/420 |
| 2011/0107270 A1* | 5/2011 | Wang | G06F 19/3481 715/850 |
| 2011/0214085 A1* | 9/2011 | Vanbree | G06T 7/30 715/781 |
| 2011/0301447 A1* | 12/2011 | Park | G06T 7/0016 600/407 |
| 2013/0028487 A1* | 1/2013 | Stager | B07C 5/342 382/110 |
| 2013/0050070 A1* | 2/2013 | Lewis | G06K 9/00604 345/156 |
| 2013/0155058 A1 | 6/2013 | Golparvar-Fard et al. | |
| 2015/0015697 A1* | 1/2015 | Redden | G01B 11/24 348/89 |
| 2015/0042663 A1* | 2/2015 | Mandel | G06T 13/80 345/474 |
| 2016/0026253 A1* | 1/2016 | Bradski | G02B 27/0172 345/8 |
| 2016/0239976 A1 | 8/2016 | Fathi et al. | |
| 2017/0018111 A1* | 1/2017 | Collet Romea | G06T 15/00 |
| 2017/0351933 A1* | 12/2017 | Bleiweiss | G06T 7/90 |
| 2018/0047177 A1* | 2/2018 | Obropta | G06T 7/55 |
| 2018/0143172 A1* | 5/2018 | McPeek | G01N 33/0098 |
| 2018/0190023 A1* | 7/2018 | Anderson | G06T 7/20 |
| 2019/0122027 A1* | 4/2019 | Prideaux-Ghee | G06T 7/246 |
| 2019/0205645 A1* | 7/2019 | Bates | G06T 11/00 |

FOREIGN PATENT DOCUMENTS

| | | |
|---|---|---|
| WO | 2016004026 | 1/2016 |
| WO | 2018042445 | 3/2018 |

OTHER PUBLICATIONS

Vazquez-Arellano et al.; 3-D Imaging Systems for Agricultural Applications—A Review;; Sensors; pp. 1-24; dated 2016.

Santos et al.; 3D Plant Modeling: Localization, Mapping and Segmentation for Plant Phenotyping Using a Single Hand-held Camera; Embrapa Agricultural Informatics; pp. 1-18; Brazil; dated 2014.

Wilson, J. Warren; Analysis of the Spatial Distribution of Foliage by Two-Dimensional Point Quadrats; University of Reading; pp. 92-99; dated 1958.

Itakura et al.; Automatic Leaf Segmentation for Estimating Leaf Area and Leaf Inclination Angle in 3D Plant Images; Sensors; pp. 1-11; dated 2018.

Guo et al.; Automatic Segmentation for Plant Leaves via Multiview Stereo Reconstruction; Hindawi; pp. 1-11; dated 2017.

Srivastava et al.; Drought Stress Classification using 3D Plant Models; Indian Institute of Technology; 9 page; India; dated 2017.

Schoning et al.; Evaluation of Multi-view 3D Reconstruction Software; University of Osnabruck; pp. 450-461; Germany; dated 2015.

Jain et al; Evaluation of Methods to Estimate Foliage Density in the Understorey of a Tropical Evergreen Forest; Current Science; vol. 98 (4); pp. 88-95; dated Feb. 25, 2010.

Jay et al.; In-Field Crop Row Phenotyping from 3D Modeling Performed Using Structure from Motion; HAL; 29 pages; dated Feb. 19, 2015.

Canfield, R. H.; Application on the Line Interception Method in Sampling Range Vegetation; Journal of Forest; vol. 39 (4); pp. 388-394; dated 1941.

Gelard et al.; Model-based Segmentation of 3D Point Clouds for Phenotyping Sunflower Plants; SCITEPRESS; pp. 459-467; France; dated 2017.

Liu et al.; Novel Low Cost 3D Surface Model Reconstruction System for Plant Phenotyping; Journal of Imaging; pp. 1-15; dated 2017.

Soltani et al.; Synthesizing 3D Shapes via Modeling Multi-View Depth Maps and Silhouettes with Deep Generative Networks; University of Massachusetts; pp. 1511-1519; dated 2017.

Inferring 3D from 2D—slides; dated Jun. 18, 2006.

Paturkar, A. et al., "Overview of Image-Based 3D Vision Systems for Agricultural Applications;" 2017 International Conference on Image and Vision Computing New Zealand (IVCNZ), IEEE; pp. 1-6; Dec. 4, 2017.

European Patent Office; International Search Report and Written Opinion of PCT application Ser. No. PCT/US2019/067218; 14 pages; dated Apr. 23, 2020.

* cited by examiner

THREE-DIMENSIONAL MODELING WITH TWO DIMENSIONAL DATA

BACKGROUND

Three-dimensional ("3D") models of objects such as plants are useful for myriad purposes, including but not limited to computational agriculture, as the 3D models can enable remote agronomy, remote plant inspection, remote breeding, and machine-driven trait extraction of key features such as fruit volume and fruit size. Capturing 3D image data natively on a large scale may be impractical for a variety of reasons, economical and/or technological. However, it is possible to derive 3D models using two-dimensional ("2D") images using 2D-to-3D techniques such as Structure from Motion ("SFM"). Accordingly, 2D vision sensors are often deployed for large scale data gathering, as would typically be more feasible for agricultural applications. However, 2D-to-3D techniques such as SFM are computationally expensive and time consuming. Further, the 3D models they produce are large and therefore may be unsuitable to transmit over remote networks and/or to render on virtual reality ("VR") or augmented reality ("AR") headsets.

In the agricultural context, the end user (e.g., a farmer, agricultural engineer, agricultural business, government, etc.) may not necessarily be interested in all features of the crop(s) being analyzed. For example, the end user may not be interested in the dirt underneath the crop if they are analyzing leaf health. As another example, the end user might not be interested in seeing the leaves at all if they are engaged in fruit counting. As yet another example, the end user may not be interested in the leaves or fruit if they are studying stem length.

SUMMARY

Implementations disclosed herein are directed to 3D modeling of objects that target specific features of interest of the objects, and ignore other features of less interest. In particular, techniques described herein facilitate efficient generation of 3D models (or "representations") of objects using 2D data, e.g., by performing 2D-to-3D processing such as SFM on those features of interest, while not performing 2D-to-3D processing on other features that are not of interest. These 3D models or representations may take various forms, such as 3D point clouds.

For example, in some implementations, a plurality of 2D images may be received from a 2D vision sensor such as an RGB camera, infrared camera, etc. The plurality of 2D images may capture an object having multiple classes of features, such as a plant that includes classes of features such as leaves, stems, fruit, flowers, underlying dirt (plant bed), branches, and so forth. Data corresponding to one or more of the multiple classes of features in which the end user is not interested may be filtered from the plurality of 2D images to generate a plurality of filtered 2D images. The plurality of filtered 2D images may omit features of the filtered classes and capture features of one or more remaining classes. Thus, for an end user interested in fruit counting, features corresponding to leaves, stems, branches, flowers (if different from fruit), and so forth, may be filtered out of the 2D images, leaving only features corresponding to fruit. This enables more efficient and/or expedient 2D-to-3D processing of the remaining 2D data into 3D data. Moreover, the resulting 3D data is not as large as comprehensive 3D data that captures all feature classes, and thus may be more easily transmittable over computing networks and/or renderable on resource-constrained devices such as VR and/or AR headsets.

In some implementations, machine learning may be employed to filter the 2D data. For example, a machine learning model such as a convolutional neural network ("CNN") may be trained to segment a plurality of 2D images into semantic regions. As a more specific example, a CNN may be trained to classify (or infer) individual pixels of the plurality of 2D images as belonging to one of multiple potential classes. In the plant context, for instance, an image of a plant may be segmented into regions depicting different classes of features, such as leaves, branches, stems, fruit, flowers, etc. 2D-to-3D processing (e.g., SFM) may then be performed on pixels of one or more selected semantic classes of the plurality of 2D images to generate a 3D representation of the object, such as a 3D point cloud. The 3D representation of the object may exclude one or more unselected semantic classes of the plurality of 2D images.

Output that conveys one or more aspects of the 3D representation of the object may then be provided in various ways. For example, by virtue of the filtering described previously, the 3D representation may be manageable from a data size standpoint and hence be transmitted, e.g., in real time, to one or more remote computing devices over one or more wired and/or wireless networks. This may be particularly beneficial in the agricultural context, in which network connectivity in fields of crops may be unreliable and/or limited.

Additionally or alternatively, in some implementations, additional downstream processing may be employed to determine various characteristics of the object depicted in the 3D representation. For example, in the agricultural context, downstream processing such as edge detection, object recognition, blob detection, etc., may be employed to count the number of fruit of a plurality of plants, determine an average fruit size based at last in part on the fruit count, and so forth.

In some implementations, rather than ignoring some classes of features and only performing 2D-to-3D processing on other classes of features, multiple classes of features may be processed separately, e.g., to generate multiple 3D representations. Each 3D representation may include one or more particular classes of features. If desired, the multiple 3D representations may be rendered simultaneously, e.g., yielding a result similar to a 3D point cloud generated from comprehensive 2D data. However, because different classes of features are represented in different 3D representations, it is possible for a user to select which classes of features are rendered and which are not. For example, each class of features may be represented as a "layer" (e.g., one layer for leaves, another for fruit, another for flowers, etc.) and a user may select which layers should be visible and which should not.

The above is provided as an overview of some implementations disclosed herein. Further description of these and other implementations is provided below.

In some implementations, a method performed by one or more processors is provided that includes: receiving a plurality of 2D images from a 2D vision sensor, wherein the plurality of 2D images capture an object having multiple classes of features; filtering data corresponding to a first set of one or more of the multiple classes of features from the plurality of 2D images to generate a plurality of filtered 2D images, wherein the plurality of filtered 2D images capture a second set of one or more of the multiple classes of features; performing structure from motion ("SFM") processing on the plurality of 2D filtered images to generate a 3D representation of the object, wherein the 3D representation of the object includes the second set of one or more features; and providing output that conveys one or more aspects of the 3D representation of the object.

In various implementations, the 3D representation of the object may exclude the first set the multiple classes of features. In various implementations, the method may further include applying the plurality of 2D images as input across a trained machine learning model to generate output data, wherein the output data semantically classifies pixels of the plurality of 2D images into the multiple classes. In various implementations, the filtering includes filtering pixels classified into one or more of the first set of one or more classes from the plurality of 2D images. In various implementations, the trained machine learning model comprises a convolutional neural network.

In various implementations, the filtering includes locating one or more bounding boxes around objects identified as members of one or more of the second set of multiple classes of features. In various implementations, the object comprises a plant, the multiple classes of features include two or more of leaf, fruit, branch, soil, and stem, and the one or more aspects of the 3D representation of the object include one or more of: a statistic about fruit of the plant; a statistic about leaves of the plant; a statistic about branches of the plant; a statistic about buds of the plant; a statistic about flowers of the plant; or a statistic about panicles of the plant.

In various implementations, the output is provided at a virtual reality ("VR") or augmented reality ("AR") headset. In various implementations, the 3D representation of the object comprises a first 3D representation of the object, and the method further comprises: filtering data corresponding to a third set of one or more of the multiple classes of features from the plurality of 2D images to generate a second plurality of filtered 2D images, wherein the second plurality of filtered 2D images capture a fourth set of one or more features of the multiple classes of features; and performing SFM processing on the second plurality of filtered images to generate a second 3D representation of the object, wherein the second 3D representation of the object includes the fourth set of one or more features. In various implementations, the output includes a graphical user interface in which the first and second 3D representations of the object are selectably renderable as layers.

In another aspect, a computer-implemented method may include: receiving a plurality of 2D images from a 2D vision sensor; applying the plurality of 2D images as input across a trained machine learning model to generate output, wherein the output semantically segments the plurality of 2D images into a plurality of semantic classes; performing 2D-to-3D processing on one or more selected semantic classes of the plurality of 2D images to generate a 3D representation of the object, wherein the 3D representation of the object excludes one or more unselected semantic classes of the plurality of 2D images; and providing output that conveys one or more aspects of the 3D representation of the object.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
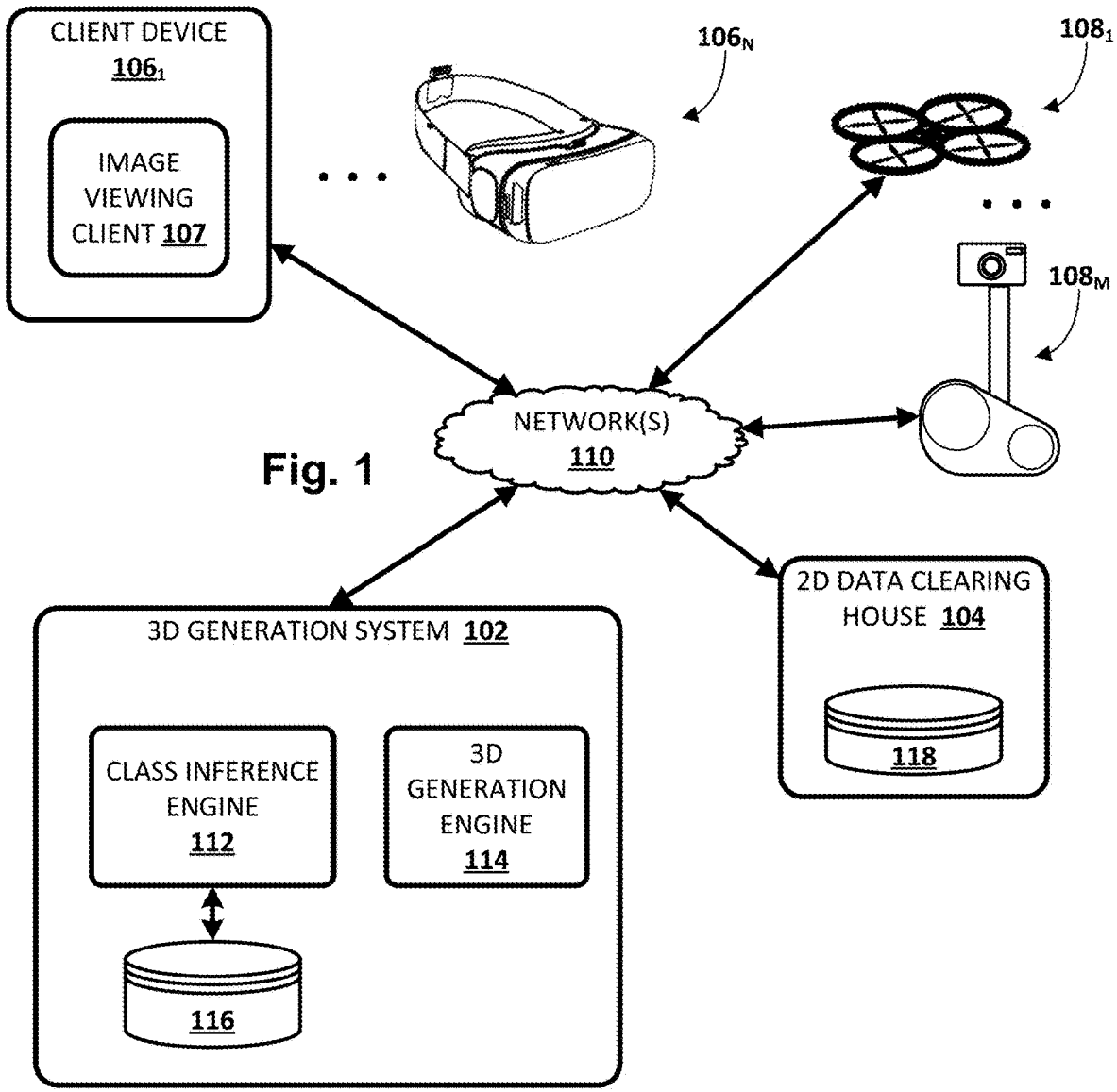
FIG. 1 schematically depicts an example environment in which disclosed techniques may be employed in accordance with various implementations.

FIG. 1 illustrates an environment in which one or more selected aspects of the present disclosure may be implemented, in accordance with various implementations. The example environment includes a plurality of client devices 1061-N, a 3D generation system 102, a 2D vision data clearing house 104, and one or more sources of 2D vision data $108_{1-M}$. Each of components 1061-N, 102, 104, and 108 may communicate, for example, through a network 110. 3D generation system 102 is an example of an information retrieval system in which the systems, components, and techniques described herein may be implemented and/or with which systems, components, and techniques described herein may interface.

An individual (which in the current context may also be referred to as a "user") may operate a client device 106 to interact with other components depicted in FIG. 1. Each component depicted in FIG. 1 may be coupled with other components through one or more networks 110, such as a local area network (LAN) or wide area network (WAN) such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an augmented reality ("AR") or virtual reality ("VR") immersive computing experience, a "smart" watch, and so forth. Additional and/or alternative client devices may be provided.

Each of client devices 106, 3D generation system 102, and 2D vision data clearing house 104 may include one or more memories for storage of data and software applications, one or more processors for accessing data and executing applications, and other components that facilitate communication over a network. The operations performed by client device 106, 3D generation system 102, and/or 2D vision data clearing house 104 may be distributed across multiple computer systems. Each of 3D generation system 102 and/or 2D vision data clearing house 104 may be implemented as, for example, computer programs running on one or more computers in one or more locations that are coupled to each other through a network.

Each client device 106 may operate a variety of different applications that may be used, for instance, to view 3D imagery that is generated using techniques described herein. For example, a first client device 1061 operates an image viewing client 107 (e.g., which may be standalone or part of another application, such as part of a web browser). Another client device $106_N$ may take the form of a HMD that is configured to render 2D and/or 3D data to a wearer as part of a VR immersive computing experience. For example, the wearer of client device $106_N$ may be presented with 3D point clouds representing various aspects of objects of interests, such as fruits of crops.

In various implementations, 3D generation system 102 may include a class inference engine 112 and/or a 3D generation engine 114. In some implementations one or more of engines 112 and/or 114 may be omitted. In some implementations all or aspects of one or more of engines 112 and/or 114 may be combined. In some implementations, one or more of engines 112 and/or 114 may be implemented in a component that is separate from 3D generation system 102. In some implementations, one or more of engines 112 and/or 114, or any operative portion thereof, may be implemented in a component that is executed by client device 106.

Class inference engine 112 may be configured to receive, e.g., from 2D vision data clearing house 104 and/or directly from data sources $108_{1-M}$, a plurality of two-dimensional 2D images captured by one or more 2D vision sensors. In various implementations, the plurality of 2D images may capture an object having multiple classes of features. For example, the plurality of 2D images may capture a plant with classes of features such as leaves, fruit, stems, roots, soil, flowers, buds, panicles, etc.

Class inference engine 112 may be configured to filter data corresponding to a first set of one or more of the multiple classes of features from the plurality of 2D images to generate a plurality of filtered 2D images. In various implementations, the plurality of filtered 2D images may capture a second set of one or more features of the remaining classes of features. In the context of 2D images of a fruit-bearing plant, class inference engine 112 may filter data corresponding a set of classes other than fruit that are not necessarily of interest to a user, such as leaves, stems, flowers, etc., leaving behind 2D data corresponding to fruit.

In some implementations, class inference engine 112 may employ one or more machine learning models stored in a database 116 to filter data corresponding to one or more feature classes from the 2D images. In some such implementations, different machine learning models may be trained to identify different classes of features, or a single machine learning model may be trained to identify multiple different classes of features. In some implementations, the machine learning model(s) may be trained to generate output that includes pixel-wise annotations that identify each pixel as being a member of a particular feature class. For example, some pixels may be identified as "fruit," other pixels as "leaves," and so on. As will be described below, in some implementations, one or more machine learning models in database 116 may take the form of a convolutional neural network ("CNN") that is trained to perform semantic segmentation to classify pixels in image as being members of particular feature classes.

2D vision data may be obtained from various sources. In the agricultural context these data may be obtained manually by individuals equipped with cameras, or automatically using one or more robots $108_{1-M}$ equipped with 2D vision sensors (M is a positive integer). Robots 108 may take various forms, such as an unmanned aerial vehicles $108_1$, a wheeled robot $108_m$, a robot (not depicted) that is propelled along a wire, track, rail or other similar component that passes over and/or between crops, or any other form of robot capable of being propelled or propelling itself past crops of interest. In some implementations, robots $108_{1-M}$ may travel along lines of crops taking pictures at some selected frequency (e.g., every second or two, every couple of feet, etc.).

Robots $108_{1-M}$ may provide the 2D vision data they capture directly to 3D generation system 102 over network(s) 110, or they provide the 2D vision data first to 2D vision data clearing house 104. 2D vision data clearing house 104 may include a database 118 that stores 2D vision data captured by any number of sources (e.g., robots 108). In some implementations, a user may interact with a client device 106 to request that particular sets of 2D vision data be processed by 3D generation system 102 using techniques described herein to generate 3D vision data that the user can then view. Because techniques described herein are capable of reducing the amount of computing resources required to generate the 3D data, and/or because the resulting 3D data may be limited to feature classes of interest, it may be possible for a user to operate client device 106 to request 3D data from yet-to-be-processed 2D data and receive 3D data relatively quickly, e.g., in near real time.

In this specification, the term "database" and "index" will be used broadly to refer to any collection of data. The data of the database and/or the index does not need to be structured in any particular way and it can be stored on storage devices in one or more geographic locations. Thus, for example, the databases 116 and 118 may include multiple collections of data, each of which may be organized and accessed differently.

Figure 2A:
FIG. 2A, FIG. 2B, FIG. 2C, and FIG. 2D depict one example of how disclosed techniques may be used to filter various features classes from 2D vision data, in accordance with various implementations.

FIGS. 2A-D depict an example of how 2D vision data may be processed by class inference engine 112 to generate multiple "layers" corresponding to multiple feature classes. In this example, the 2D image in FIG. 2A depicts a portion of a grape plant or vine. In some implementations, techniques described herein may utilize multiple 2D images of the same plant for 2D-to-3D processing, such as structure from motion ("SFM") processing, to generate 3D data. However, for purposes of illustration, the Figures herein only include a single image. Moreover, while examples described herein refer to SFM motion processing, this is not meant to be limiting. Other types of 2D-to-3D processing may be employed to generate 3D data from 2D image data, such as supervised and/or unsupervised machine learning techniques (e.g., CNNs) for learning 3D structure from 2D images, etc.

It may be the case that an end user such as a farmer, an investor in a farm, a crop breeder, or a futures trader, is primarily interested in how much fruit is currently growing in a particular area of interest, such as a field, a particular farm, a particular region, etc. Accordingly, they might operate a client device 106 to request 3D data corresponding to a particular type of observed fruit in the area of interest. Such a user may not necessarily be interested in features such as leaves or branches, but instead may be primarily interested features such as fruit. Accordingly, class inference engine 112 may apply one or more machine learning models stored in database 116, such as a machine learning model trained to generate output that semantically classifies individual pixels as being grapes, to generate 2D image data that includes pixels classified as grapes, and excludes other pixels.

Figure 2B:
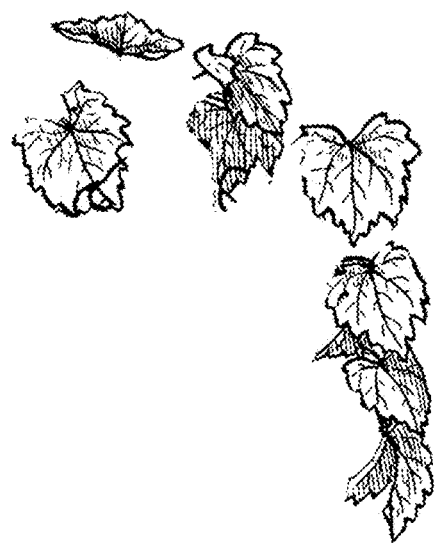
Figure 2C:
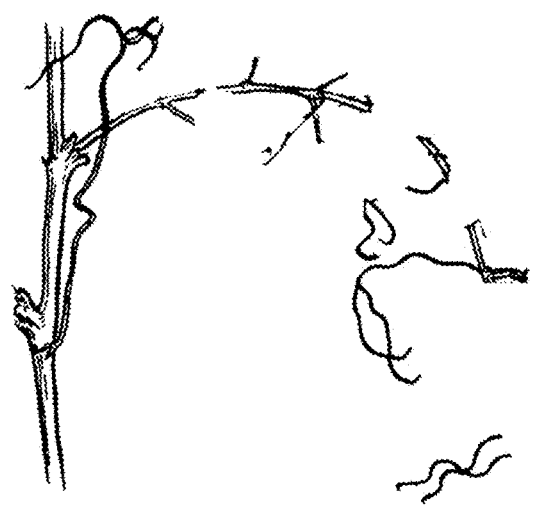
Figure 2D:
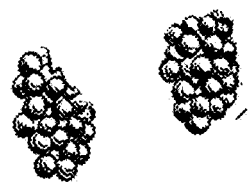

FIGS. 2B-D each depicts 2D vision data from the image in FIG. 2A that has been classified, e.g., by class inference engine 112, as belonging to a particular feature class, and that excludes or filters 2D vision data from other feature classes. For example, FIG. 2B depicts the 2D vision data that corresponds to leaves of the grape plant, and excludes features of other classes. FIG. 2C depicts the 2D vision data that corresponds to stems and branches of the grape plant, and excludes features of other classes. FIG. 2D depicts the 2D vision data that corresponds to the fruit of the grape plant, namely, bunches of grapes, and excludes features of other classes.

In various implementations, the image depicted in FIG. 2D, and similar images that have been processed to retain fruit and exclude features of other classes, may be retrieved, e.g., by 3D generation engine 114 from class inference engine 112. These retrieved images may then be processed, e.g., by 3D generation engine 114 using SFM processing, to generate 3D data, such as 3D point cloud data. This 3D data may be provided to the client device 106 operated by the end user. For example, if the end user operated HMD client device $106_N$ to request the 3D data, the 3D data may be rendered on one or more displays of HMD client device 106N, e.g., using stereo vision.

There may be instances in which an end user is interested in an aspect of a crop other than fruit. For example, it may be too early in the crop season for fruit to appear. However, other aspects of the crops may be useful for making determinations about, for instance, crop health, growth progression, etc. For example, early in the crop season some users may be interested in feature classes such as leaves, which may be analyzed using techniques described herein to determine aspects of crop health. As another non-limiting example, branches may be analyzed to determine aspects of crop health and/or uniformity among crops in a particular area. If stems are much shorter on one corner of a field that the rest of the field, that may indicate that the corner of the field is subject to some negatively impacting phenomena, such as flooding, disease, over/under fertilization, over exposure of elements such as wind or sun, etc.

In any of these examples, techniques described herein may be employed to isolate desired crop features in 2D vision data so that those features alone can be processed into 3D data, e.g., using SFM techniques. Additionally or alternatively, multiple feature classes of potential interest may be segmented from each other, e.g., so that one set of 2D vision data includes only (or at least primarily) fruit data, another set of 2D vision data includes stem/branch data, another set of 2D vision data includes leaf data, and so forth (e.g., as demonstrated in FIGS. 2B-D). These distinct sets of data may be separately processed, e.g., by 3D generation engine 114, into separate sets of 3D data (e.g., point clouds). However, the separate sets of 3D data may still be spatially align-able with each other, e.g., so that each can be presented as an individual layer of an application for viewing the 3D data. If the user so chooses, he or she can select multiple such layers at once to see, for example, fruit and leaves together, as they are observed on the real life crop.

Figure 3:
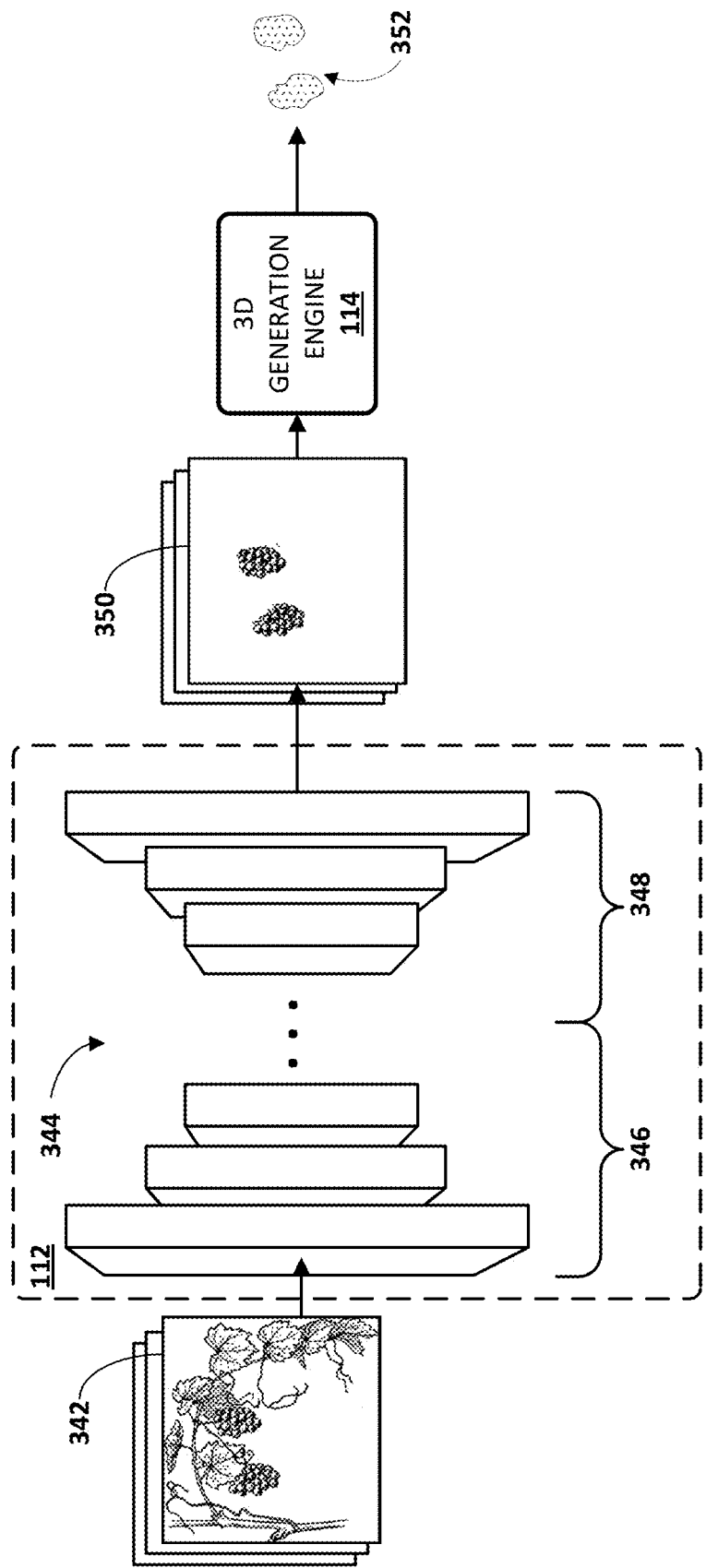
FIG. 3 depicts an example of how 2D vision data may be processed using techniques described herein to generate 3D data.

FIG. 3 depicts an example of how data may be processed in accordance with some implementations of the present disclosure. 2D image data in the form of a plurality of 2D images 342 are applied as input, e.g., by class inference engine 112, across a trained machine learning model 344. In this example, trained machine learning model 344 takes the form of a CNN that includes an encoder portion 346, also referred to as a convolution network, and a decoder portion 348, also referred to as a deconvolution network. In some implementations, decoder 348 may semantically project lower resolution discriminative features learned by encoder 346 onto the higher resolution pixel space to generate a dense pixel classification.

Machine learning model 344 may be trained in various ways to classify pixels of 2D vision data as belonging to various feature classes. In some implementations, machine learning model 344 may be trained to classify individual pixels as members of a class, or not members of the class. For example, one machine learning model 344 may be trained to classify individual pixels as depicting leaves of a particular type of crop, such as grape plants, and to classify other pixels as not depicting leaves of a grape plant. Another machine learning model 344 may be trained to classify individual pixels as depicting fruit of a particular type of crop, such as grape bunches, and to classify other pixels as not depicting grapes. Other models may be trained to classify pixels of 2D vision data into multiple different classes.

In some implementations, a processing pipeline may be established that automates the inference process for multiple types of crops. For example, 2D vision data may be first analyzed, e.g., using one or more object recognition techniques or trained machine learning models, to predict what kind of crop is depicted in the 2D vision data. Based on the predicted crop type, the 2D vision data may then be processed by class inference engine 112 using a machine learning model associated with the predicted crop type to generate one or more sets of 2D data that each includes a particular feature class and excludes other feature classes.

In some implementations, output generated by class inference engine 112 using machine learning model 344 may take the form of pixel-wise classified 2D data 350. In FIG. 3, for instance, pixel-wise classified 2D data 350 includes pixels classified as grapes, and excludes other pixels. This pixel-wise classified 2D data may be processed by 3D generation engine 114, e.g., using techniques such as SFM, to generate 3D data 352, which may be, for instance, a point cloud representing the 3D spatial arrangement of the grapes depicted in the plurality of 2D images 342. Because only the pixels classified as grapes were processed by 3D generation engine 114, rather than all the pixels of 2D images 342, considerable computing resources are conserved because vast pixel data of little or no interest (e.g., leaves, stems, branches) is not processed. Moreover, the resultant 3D point cloud data is smaller, requiring less memory and/or network resources (when being transmitted over computing networks).

Figure 4:
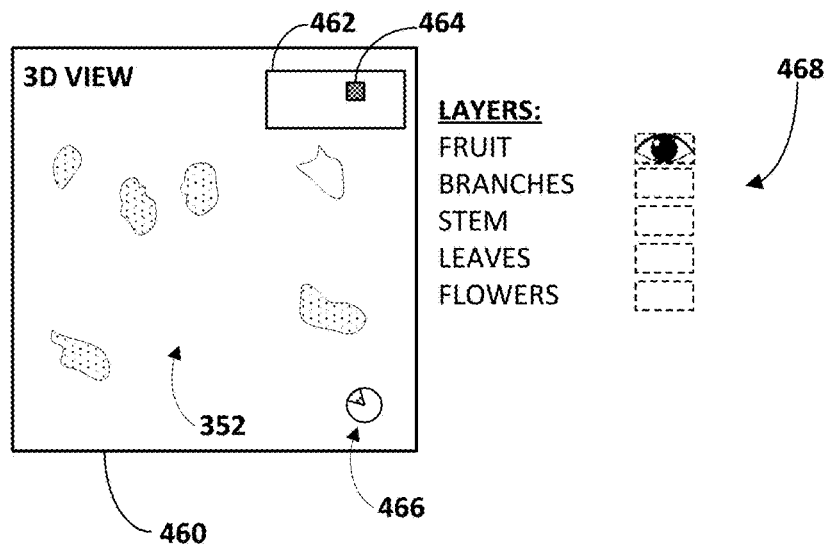
FIG. 4 depicts an example graphical user interface ("GUI") that may be provided to facilitate techniques described herein.

FIG. 4 depicts an example graphical user interface ("GUI") 400 that may be rendered to allow a user to initiate and/or make use of techniques described herein. GUI 400 includes a 3D navigation window 460 that is operable to allow a user to navigate through a virtual 3D rendering of an area of interest, such as a field. A map graphical element 462 depicts outer boundaries of the area of interest, while a location graphical indicator 464 within map graphical element 462 depicts the user's current virtual "location" within the area of interest. The user may navigate through the virtual 3D rendering, e.g., using a mouse or keyboard input, to view different parts of the area of interest. Location graphical indicator 464 may track the user's "location" within the entire virtual 3D rendering of the area of interest.

Another graphical element 466 may operate as a compass that indicates which direction within the area of interest the user is facing, at least virtually. A user may change the viewing perspective in various ways, such as using a mouse, keyboard, etc. In other implementations in which the user navigates through the 3D rendering immersively using a HMD, eye tracking may be used to determine a direction of the user's gaze, or other sensors may detect when the user's head is turned in a different direction. Either form of observed input may impact what is rendered on the display(s) of the HMD.

3D navigation window 460 may render 3D data corresponding to one or more feature classes selected by the user. For example, GUI 400 includes a layer selection interface 468 that allows for selection of one or more layers to view. Each layer may include 3D data generated for a particular feature class as described herein. In the current state depicted in FIG. 4, for instance, the user has elected (as indicated by the eye graphical icon) to view the FRUIT layer, while other layers such as BRANCHES, STEM, LEAVES, etc., are not checked. Accordingly, the only 3D data rendered in 3D navigation window 460 is 3D point cloud data 352 corresponding to fruit, in this example bunches of grapes. If the user were to select more layers or different layers using layer selection interface 468, then 3D point cloud data for those feature classes would be rendered in navigation window 460. In some implementations, if 3D data is not generated for a particular feature class (e.g., to conserve computing resources), then that feature class may be not be available in layer selection interface 468, or may be rendered to be inactive to indicate to the user that the feature class was not processed.

GUI 400 also includes statistics about various feature classes of the observed crops. These statistics may be compiled for particular feature classes in various ways. For example, in some implementations, 3D point cloud data for a given feature class may be used to determine various observed statistics about that class of features. Continuing with the grape plant example, GUI 400 includes statistics related to fruit detected in the 3D point cloud data, such as total estimated fruit volume, average fruit volume, average fruit per square meter (or other distance unit, may be user-selectable), average fruit per plant, total estimated culled fruit (e.g., fruit detected that has fallen onto the ground), and so forth. Of course, these are just examples and are not meant to be limiting. Statistics are also provided for other feature classes, such as leaves, stems, and branches. Other statistics may be provided in addition to or instead of those depicted in FIG. 400, such as statistics about buds, flowers, panicles, etc.

In some implementations, statistics about one feature class may be leveraged to determine statistics about other feature classes. As a non-limiting example, fruits such as grapes are often at least partially obstructed by objects such as leaves. Consequently, robots 108 may not be able to capture, in 2D vision data, every single fruit on every single plant. However, general statistics about leaf coverage may be used to estimate some amount of fruit that is likely obstructed, and hence not explicitly captured in the 3D point cloud data. For example, the average leaf size and/or average leaves per plant may be used to infer that, for every unit of fruit observed directly in the 2D vision data, there is likely some amount of fruit that is obstructed by the leaves. Additionally or alternatively, statistics about leaves, branches, and stems that may indicate the general health of a plant may also be used to infer how much fruit a plant of that measure of general health will likely produce.

As another example, statistics about one component of a plant at a first point in time during a crop cycle may be used to infer statistics about that component, or a later version of that component, at a second point in time later in the crop cycle. For example, suppose that early in a crop cycle, buds of a particular plant are visible. These buds may eventually turn into other components such as flowers or fruit, but at this point in time they are buds. Suppose further that in this early point in the crop cycle, the plant's leaves offer relatively little obstruction, e.g., because they are smaller and/or less dense than they will be later in the crop cycle. It might be the case, then, that numerous buds are currently visible in the 2D vision data, whereas the downstream versions (e.g., flowers, fruit) of these buds will likely be more obstructed because the foliage will be thicker later in the crop cycle. In such a scenario, an early-crop-cycle statistic about buds may be used to at least partially infer the presence of at least downstream versions of buds.

In some such implementations, a foliage density may be determined at both points in time during the crop cycle, e.g., using techniques such as point quadrat, line interception, techniques that employ spherical densitometers, etc. The fact that the foliage density early in the crop cycle is less than the foliage density later in the crop cycle may be used in combination with a count of buds detected early in the crop cycle to potentially elevate the number of fruit/flowers estimated later in the crop cycle, with the assumption being the additional foliage obstructs at least some flowers/fruit. Other parameters may also be taken into account during such an inference, such as an expected percentage of successful transitions of buds to downstream components. For example, if 60% of buds generally turn into fruit, and the other 40% do not, that can be taken into account along with these other data to infer the presence of obstructed fruit.

Figure 5:
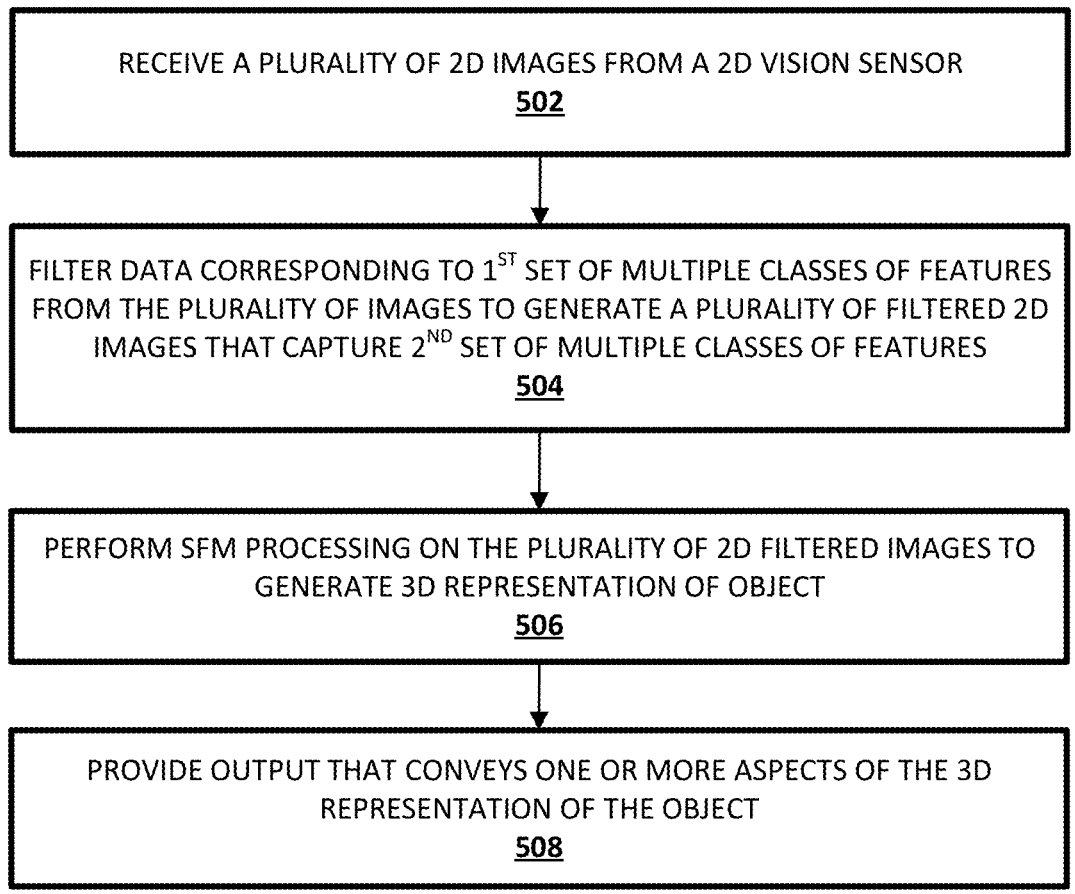
FIG. 5 and FIG. 6 are flowcharts of example methods in accordance with various implementations described herein.

FIG. 5 illustrates a flowchart of an example method 500 for practicing selected aspects of the present disclosure. The operations of FIG. 5 can be performed by one or more processors, such as one or more processors of the various computing devices/systems described herein. For convenience, operations of method 500 will be described as being performed by a system configured with selected aspects of the present disclosure. Other implementations may include additional steps than those illustrated in FIG. 5, may perform step(s) of FIG. 5 in a different order and/or in parallel, and/or may omit one or more of the steps of FIG. 5.

At block 502, the system may receive a plurality of 2D images from a 2D vision sensor, such as one or more robots 108 that roam through crop fields acquiring digital images of crops. In some cases, the plurality of 2D images may capture an object having multiple classes of features, such as a crop having leaves, stem(s), branches, fruit, flowers, etc.

At block 504, the system may filter data corresponding to a first set of one or more of the multiple classes of features from the plurality of 2D images to generate a plurality of filtered 2D images. For example, the first set of classes of features may include leaves, stem(s), branches, and any other feature class that is not currently of interest, and hence are filtered from the images. The resulting plurality of filtered 2D images may capture a second set of one or more features of the multiple classes of features that are desired, such as fruit, flowers, etc. An example of filtered 2D images was depicted at 350 in FIG. 3. The filtering operations may be performed in various ways, such as using a CNN as depicted in FIG. 3, or by using object detection as described below with respect to FIG. 7.

At block 506, the system may perform SFM processing on the plurality of 2D filtered images to generate a 3D representation of the object. Notably the 3D representation of the object may include the second set of one or more features, and may exclude the first set of the multiple classes of features. An example of such a 3D representation was depicted in FIG. 3 at 352.

At block 508, the system may provide output that conveys one or more aspects of the 3D representation of the object. For example, if the user is operating a computing device with a flat display, such as a laptop, tablet, desktop, etc., the user may be presented with at GUI such as GUI 400 of FIG. 4. If the user is operating a client device that offers an immersive experience, such as HMD client device $106_N$ in FIG. 1, the user may be presented with a GUI that is tailored towards the immersive computing experience, e.g., with virtual menus and icons that the user can interact with using their gaze. In some implementations, the output may include a report that conveys the same or similar statistical data as was conveyed at the bottom of GUI 400 in FIG. 4. In some such implementations, this report may be rendered on an electronic display and/or printed to paper.

Figure 6:
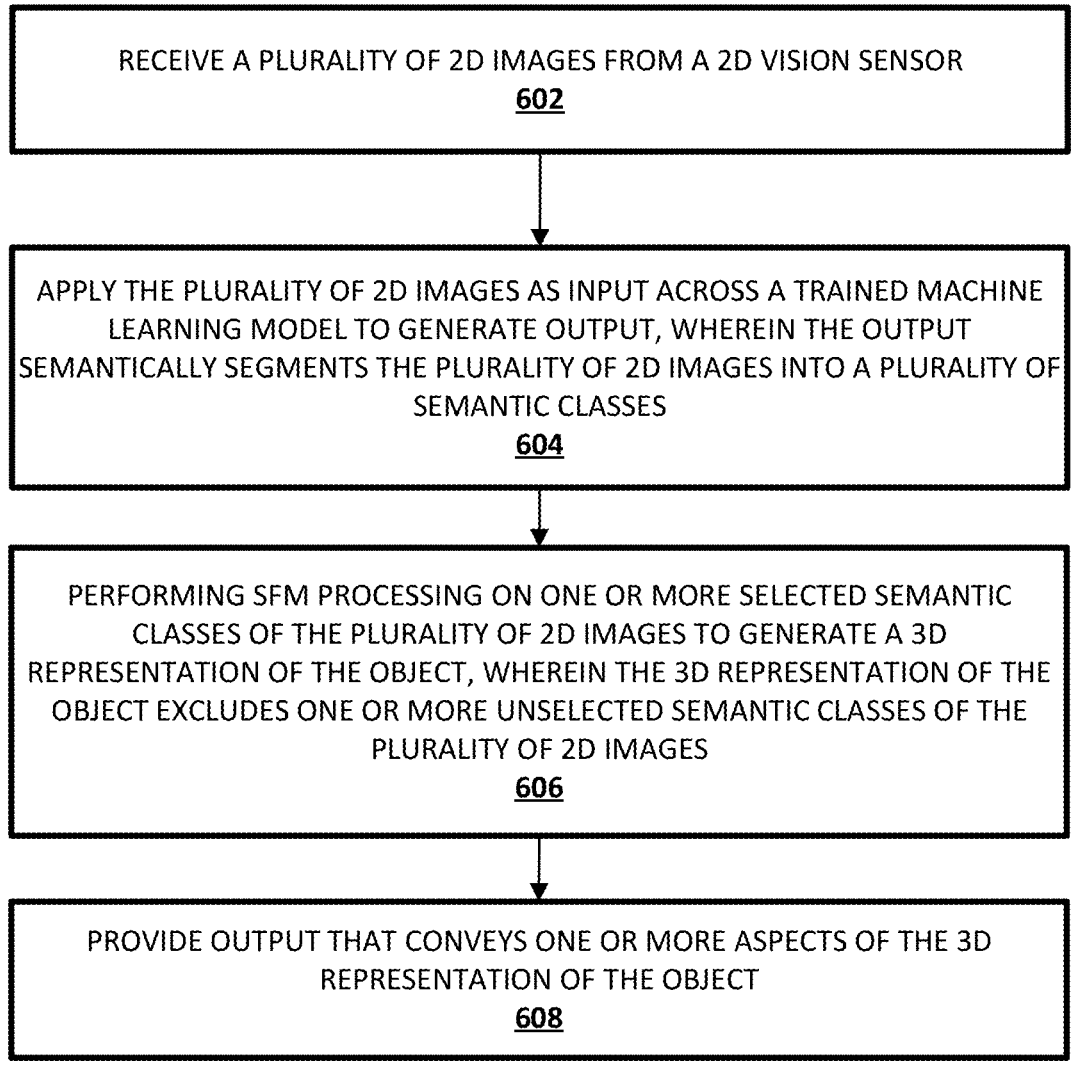

FIG. 6 illustrates a flowchart of an example method 600 for practicing selected aspects of the present disclosure, and constitutes a variation of method 500 of FIG. 5. The operations of FIG. 6 can be performed by one or more processors, such as one or more processors of the various computing devices/systems described herein. For convenience, operations of method 600 will be described as being performed by a system configured with selected aspects of the present disclosure. Other implementations may include additional steps than those illustrated in FIG. 6, may perform step(s) of FIG. 6 in a different order and/or in parallel, and/or may omit one or more of the steps of FIG. 6.

Blocks 602 and 608 of FIG. 6 are similar to blocks 502 and 508 of FIG. 5, and so will not be described again in detail. At block 604, the system, e.g., by way of class inference engine 112, may apply the plurality of 2D images retrieved at block 602 as input across a trained machine learning model, e.g., 344, to generate output. The output may semantically segment (or classify) the plurality of 2D images into a plurality of semantic classes. For example, some pixels may be classified as leaves, other pixels as fruit, other pixels as branches, and so forth.

At block 606, which may be somewhat similar to block 506 of FIG. 5, the system may perform SFM processing on one or more selected semantic classes of the plurality of 2D images to generate a 3D representation of the object. The 3D representation of the object may exclude one or more unselected semantic classes of the plurality of 2D images. Thus for instance, if the user is interested in fruit, the pixels semantically classified as fruit will be processed using SFM processing into 3D data. Pixels classified into other feature classes, such as leaves, stems, branches, etc., may be excluded from the SFM processing.

In various implementations, the operations of method 500 and/or 600 may be repeated, e.g., for each of a plurality of feature classes of an object. These multiple feature classes may be use to generate multi-layer representation of an object similar to that described in FIG. 4, with each selectable layer corresponding to a different feature class.

While examples described herein have related to crops and plants, this is not meant to be limiting, and techniques described herein may be applicable for any type of object that has multiple classes of features. For example, 2D vision data may be captured of a geographic area. Performing SFM processing on comprehensive 2D vision data of the geographic area may be impractical, particularly where numerous transient features such as people, cars, animals, etc. may be present in at least some of the 2D image data. But performing SFM processing on selected features of the 2D vision data, such as more permanent features like roads, buildings, and other prominent features, architectural and/or geographic, may be a more efficient way of generating 3D mapping data. More generally, techniques described herein may be applicable in any scenario in which SFM processing is performed on 2D vision data where at least some feature classes are of less interest than others.

Figure 7:
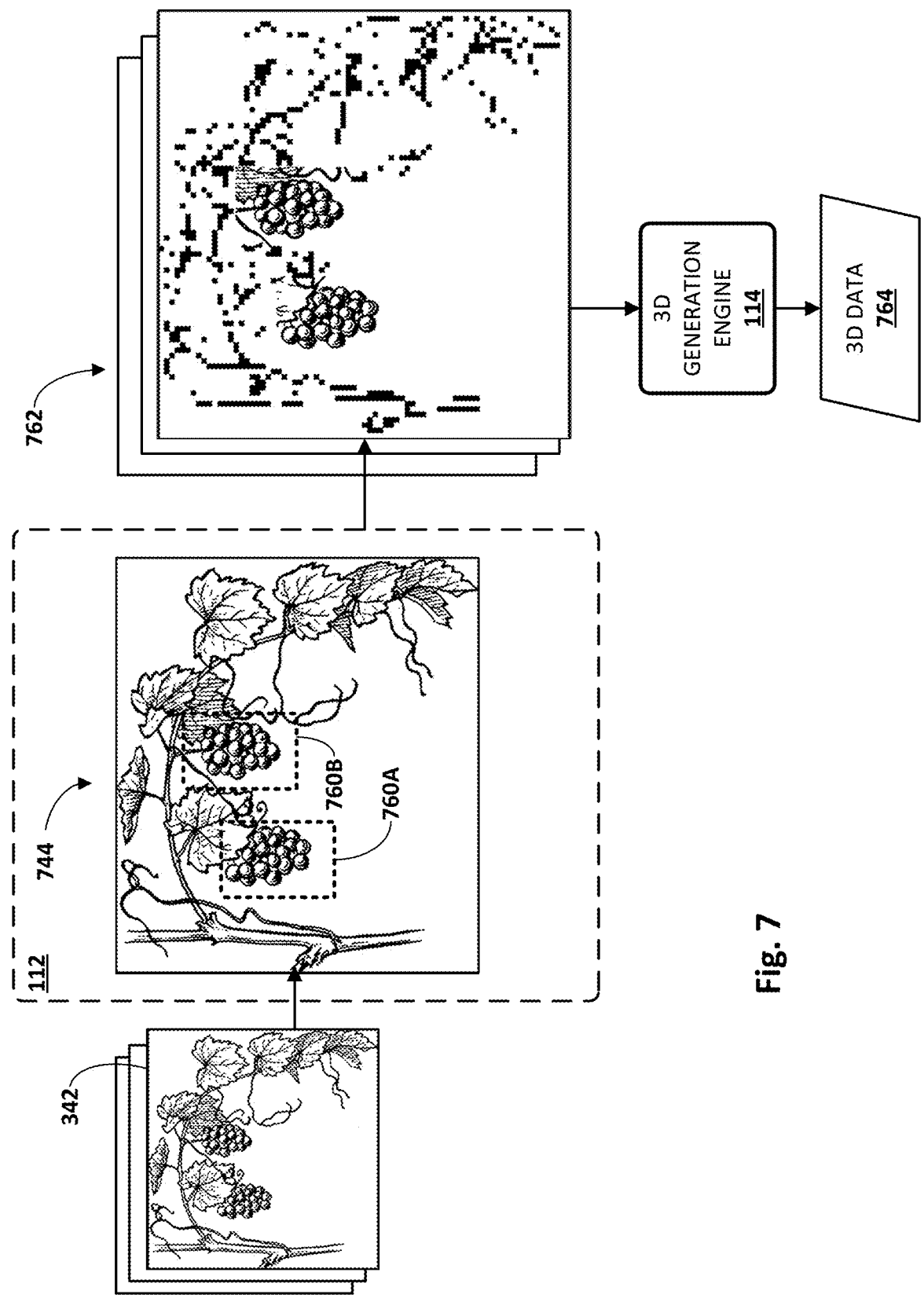
FIG. 7 depicts another example of how 2D vision data may be processed using techniques described herein to generate 3D data.

FIG. 7 depicts another example of how 2D vision data may be processed using techniques described herein to generate 3D data. Some components of FIG. 7, such as plurality of 2D images 342, are the same as in FIG. 3. In this implementation, class inference engine 112 utilizes a different technique than was used in FIG. 3 to isolate objects of interest for 2D-to-3D processing. In particular, class inference engine 112 performs object detection, or in some cases object segmentation, to locate bounding boxes around objects of interest. In FIG. 7, for instance, two bounding boxes 760A and 760B are identified around the two visible bunches of grapes.

In some implementations, the pixels inside of these bounding boxes 760A and 760B may be extracted and used to perform dense feature detection to generate feature points at a relatively high density. Although this dense feature detection can be relatively expensive computationally, computational resources are conserved because it is only performed on pixels within bounding boxes 760A and 760B. In some implementations, pixels outside of these bounding boxes may not be processed at all, or may be processed using sparser feature detection, which generates fewer feature points at less density and may be less computationally expensive.

The contrast between dense data and sparse data is evident in the filtered 2D data 762 depicted in FIG. 7, in which the grapes and other objects within bounding boxes 760A-B are at a relatively high resolution (i.e. dense), but data outside of these boxes is relatively sparse. Consequently, when filtered 2D data 762 is provided to 3D generation engine 114, 3D generation engine 114 may be able to perform the 2D-to-3D processing more quickly than if it received dense feature point data for the entirety of the plurality of 2D images 342. Moreover, the resulting 3D data 764, e.g., a point cloud, may be less voluminous from a memory and/or network bandwidth standpoint.

Figure 8:
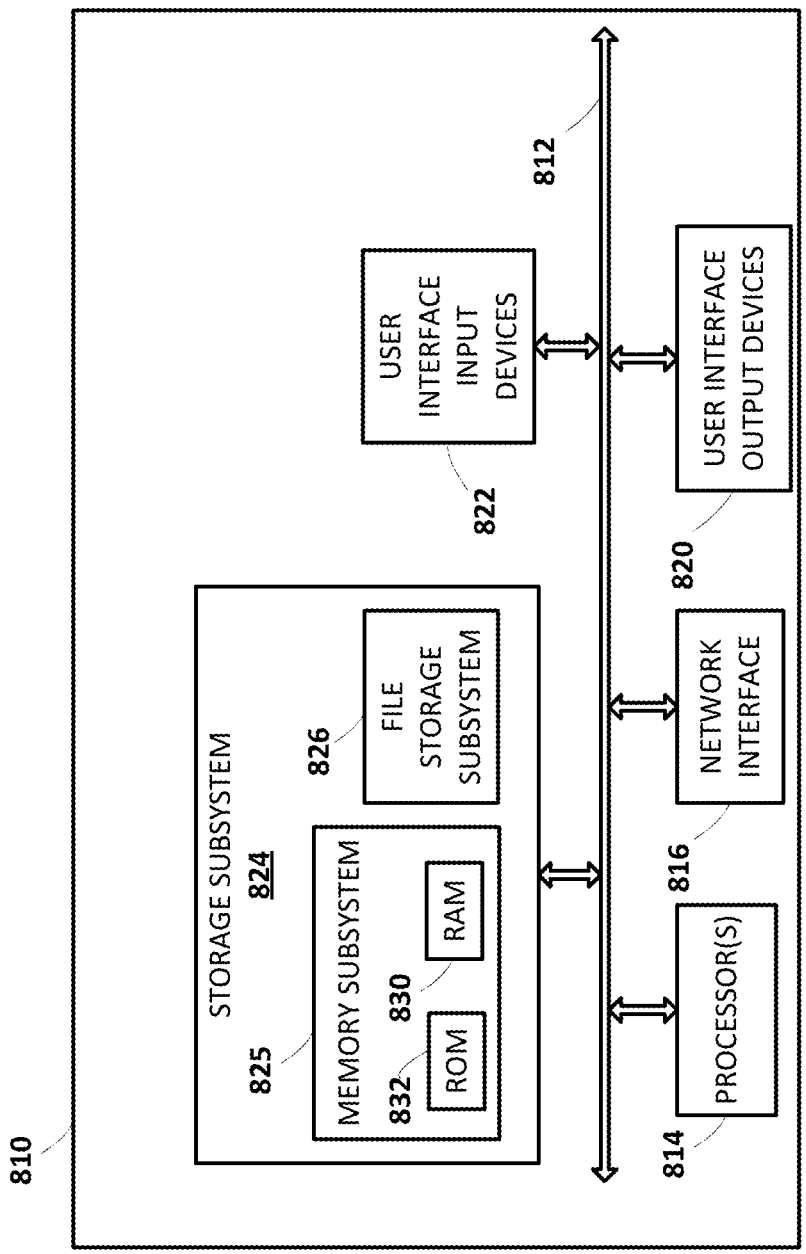
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 810 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method described herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
receiving, via a computing device operated by a user, input that identifies the user's viewing perspective while the user operates the computing device to navigate through a virtual rendering of an area of interest;
based on the user's viewing perspective, retrieving from a database a plurality of two-dimensional ("2D") images captured by a 2D vision sensor, wherein the plurality of 2D images capture a plant in the area of interest having multiple classes of plant features;
filtering data corresponding to a first set of one or more of the multiple classes of plant features from the plurality of 2D images to generate a plurality of filtered 2D images, wherein the plurality of filtered 2D images capture a second set of one or more of the multiple classes of plant features;
performing structure from motion ("SFM") processing on the plurality of 2D filtered images to generate a three-dimensional ("3D") representation of the plant, wherein the 3D representation of the plant includes the second set of one or more of the multiple classes of plant features; and
providing, at the computing device, output that conveys one or more aspects of the 3D representation of the plant.

2. The method of claim 1, wherein the 3D representation of the plant excludes the first set of the one or more of the multiple classes of plant features.

3. The method of claim 1, further comprising applying the plurality of 2D images as input across a trained machine learning model to generate output data, wherein the output data semantically classifies pixels of the plurality of 2D images into the multiple classes of plant features.

4. The method of claim 3, wherein the filtering includes filtering pixels classified into one or more of the first set of one or more classes of plant features from the plurality of 2D images.

5. The method of claim 3, wherein the trained machine learning model comprises a convolutional neural network.

6. The method of claim 1, wherein the filtering includes locating one or more bounding boxes around plants identified as members of one or more of the second set of multiple classes of plant features.

7. The method of claim 1, wherein the multiple classes of plant features include two or more of leaf, fruit, branch, soil, and stem, and wherein the one or more aspects of the 3D representation of the plant include one or more of:
- a statistic about fruit of the plant;
- a statistic about leaves of the plant;
- a statistic about branches of the plant;
- a statistic about buds of the plant;
- a statistic about flowers of the plant; or
- a statistic about panicles of the plant.

8. The method of claim 1, wherein the computing device comprises a virtual reality ("VR") or augmented reality ("AR") headset, and the input comprises eye tracking data or sensor data that conveys a direction the user is facing.

9. The method of claim 1, wherein the 3D representation of the plant comprises a first 3D representation of the plant, and the method further comprises:
filtering data corresponding to a third set of one or more of the multiple classes of plant features from the plurality of 2D images to generate a second plurality of filtered 2D images, wherein the second plurality of filtered 2D images capture a fourth set of one or more plant features of the multiple classes of plant features; and
performing SFM processing on the second plurality of filtered images to generate a second 3D representation of the plant, wherein the second 3D representation of the plant includes the fourth set of one or more plant features;
wherein the output comprises a graphical user interface in which the first and second 3D representations of the plant are selectably renderable as layers.

10. A method implemented using one or more processors, comprising:
receiving, via a computing device operated by a user, input that identifies the user's viewing perspective while the user operates the computing device to navigate through a virtual rendering of an area of interest;
based on the user's viewing perspective, retrieving from a database receiving a plurality of two-dimensional ("2D") images captured by a 2D vision sensor;
applying the plurality of 2D images as input across a trained machine learning model to generate output data, wherein the output data semantically segments the plurality of 2D images into a plurality of semantic classes;
performing structure from motion ("SFM") processing on one or more selected semantic classes of the plurality of 2D images to generate a three-dimensional ("3D") representation of an object, wherein the 3D representation of the object excludes one or more unselected semantic classes of the plurality of 2D images; and
providing, at the client computing device, output that conveys one or more aspects of the 3D representation of the object.

11. The method of claim 10, wherein the trained machine learning model comprises a convolutional neural network.

12. The method of claim 10, wherein the object comprises a plant, the plurality of semantic classes include two or more of leaf, fruit, branch, soil, stem, flower, bud, and panicle.

13. The method of claim 10, wherein the computing device comprises a virtual reality ("VR") or augmented reality ("AR") headset, and the input comprises eye tracking data or sensor data that conveys a direction the user is facing.

14. At least one non-transitory computer-readable medium comprising instructions that, in response to execution of the instructions by one or more processors, cause the one or more processors to perform the following operations:
receiving, via a computing device operated by a user, input that identifies the user's viewing perspective while the user operates the computing device to navigate through a virtual rendering of an area of interest;
based on the user's viewing perspective, retrieving from a database a plurality of two-dimensional ("2D") images captured by a 2D vision sensor, wherein the plurality of 2D images capture a plant having multiple classes of plant features;
filtering data corresponding to a first set of one or more of the multiple classes of plant features from the plurality of 2D images to generate a plurality of filtered 2D images, wherein the plurality of filtered 2D images capture a second set of one or more plant features of the multiple classes of plant features;
performing two-dimensional-to-three dimensional ("2D-to-3D") processing on the plurality of 2D filtered images to generate a 3D representation of the plant, wherein the 3D representation of the plant includes the second set of one or more plant features; and
providing, at the computing device, output that conveys one or more aspects of the 3D representation of the plant.

15. The at least one non-transitory computer-readable medium of claim 14, wherein the 3D representation of the plant excludes the first set of one or more of the multiple classes of plant features.

16. The at least one non-transitory computer-readable medium of claim 14, further comprising instructions for applying the plurality of 2D images as input across a trained machine learning model to generate output data that semantically classifies pixels of the plurality of 2D images into the multiple classes of plant features.

17. The at least one non-transitory computer-readable medium of claim 16, wherein the filtering includes filtering pixels classified into one or more of the first set of one or more classes of plant features from the plurality of 2D images.

18. The at least one non-transitory computer-readable medium of claim 16, wherein the trained machine learning model comprises a convolutional neural network.

19. The at least one non-transitory computer-readable medium of claim 14, wherein the multiple classes of plant features include two or more of leaf, fruit, branch, soil, and stem.

20. The at least one non-transitory computer-readable medium of claim 19, wherein the one or more aspects of the 3D representation of the plant include one or more of:
- a statistic about fruit of the plant;
- a statistic about leaves of the plant;
- a statistic about branches of the plant;
- a statistic about buds of the plant;
- a statistic about flowers of the plant; and
- a statistic about panicles of the plant.

* * * * *